US 9,509,133 B2

(12) United States Patent
Saig et al.

(10) Patent No.: US 9,509,133 B2
(45) Date of Patent: Nov. 29, 2016

(54) PROTECTION OF DISTRIBUTED ANTENNA SYSTEMS

(71) Applicant: CORNING OPTICAL COMMUNICATIONS WIRELESS LTD, Airport City (IL)

(72) Inventors: Maor Saig, Shaarey-Tikva (IL); Ronen Schwartzman, Rehovot (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 49 days.

(21) Appl. No.: 14/317,475

(22) Filed: Jun. 27, 2014

(65) Prior Publication Data

US 2015/0380928 A1 Dec. 31, 2015

(51) Int. Cl.

| | |
|---|---|
| *H02H 7/20* | (2006.01) |
| *H02H 9/00* | (2006.01) |
| *H04B 1/40* | (2015.01) |
| *H04B 10/2575* | (2013.01) |
| *H04B 1/04* | (2006.01) |
| *H04W 88/08* | (2009.01) |

(52) U.S. Cl.
CPC ............... *H02H 7/20* (2013.01); *H02H 9/00* (2013.01); *H04B 1/04* (2013.01); *H04B 1/40* (2013.01); *H04B 10/25753* (2013.01); *H04W 88/08* (2013.01)

(58) Field of Classification Search
CPC ........... H02H 7/20; H02H 9/00; H04B 1/40; H04B 10/25753; H04W 88/08
USPC ....................................................... 361/54
See application file for complete search history.

(56) References Cited

U.S. PATENT DOCUMENTS

| | | | |
|---|---|---|---|
| 4,449,246 A | 5/1984 | Seiler et al. | |
| 4,665,560 A | 5/1987 | Lange | |
| 4,939,852 A | 7/1990 | Brenner | |
| 4,972,346 A | 11/1990 | Kawano et al. | |
| 5,056,109 A | 10/1991 | Gilhousen et al. | |
| 5,187,803 A | 2/1993 | Sohner et al. | |
| 5,206,655 A | 4/1993 | Caille et al. | |
| 5,208,812 A | 5/1993 | Dudek et al. | |
| 5,278,989 A | 1/1994 | Burke et al. | |

(Continued)

FOREIGN PATENT DOCUMENTS

| | | |
|---|---|---|
| CN | 101030162 A | 9/2007 |
| CN | 101232179 A | 7/2008 |

(Continued)

OTHER PUBLICATIONS

Patent Cooperation Treaty, International Search Report for PCT/IL2015/050656, dated Oct. 8, 2015, 9 pages.

(Continued)

*Primary Examiner* — Zeev V Kitov
*Assistant Examiner* — Kevin J Comber
(74) *Attorney, Agent, or Firm* — C. Keith Montgomery

(57) ABSTRACT

A protection circuit may be configured for detecting electrical power of downlink radio frequency (RF) signals, and diverting a substantial portion of the downlink RF signals away from a downlink RF interface of a distributed antenna system DAS in response to the detected electrical power being equal to or greater than a predetermined electrical power. The downlink RF signals diverted away from the downlink RF interface may be routed to an electrical load. The protection circuit may include hysteresis.

10 Claims, 3 Drawing Sheets

(56) References Cited

U.S. PATENT DOCUMENTS

| | | |
|---|---|---|
| 5,280,472 A | 1/1994 | Gilhousen et al. |
| 5,381,459 A | 1/1995 | Lappington |
| 5,396,224 A | 3/1995 | Dukes et al. |
| 5,420,863 A | 5/1995 | Taketsugu et al. |
| 5,432,838 A | 7/1995 | Purchase et al. |
| 5,436,827 A | 7/1995 | Gunn et al. |
| 5,519,830 A | 5/1996 | Opoczynski |
| 5,534,854 A | 7/1996 | Bradbury et al. |
| 5,559,831 A | 9/1996 | Keith |
| 5,598,314 A | 1/1997 | Hall |
| 5,606,725 A | 2/1997 | Hart |
| 5,668,562 A | 9/1997 | Cutrer et al. |
| 5,682,256 A | 10/1997 | Motley et al. |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,889,469 A | 3/1999 | Mykytiuk et al. |
| 5,953,670 A | 9/1999 | Newson |
| 5,969,837 A | 10/1999 | Farber et al. |
| 5,983,070 A | 11/1999 | Georges et al. |
| 6,006,069 A | 12/1999 | Langston |
| 6,011,980 A | 1/2000 | Nagano et al. |
| 6,014,546 A | 1/2000 | Georges et al. |
| 6,037,898 A | 3/2000 | Parish et al. |
| 6,060,879 A | 5/2000 | Mussenden |
| 6,069,721 A | 5/2000 | Oh et al. |
| 6,118,767 A | 9/2000 | Shen et al. |
| 6,122,529 A | 9/2000 | Sabat, Jr. et al. |
| 6,125,048 A | 9/2000 | Loughran et al. |
| 6,128,477 A | 10/2000 | Freed |
| 6,157,810 A | 12/2000 | Georges et al. |
| 6,163,266 A | 12/2000 | Fasullo et al. |
| 6,188,876 B1 | 2/2001 | Kim |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,236,863 B1 | 5/2001 | Waldroup et al. |
| 6,275,990 B1 | 8/2001 | Dapper et al. |
| 6,279,158 B1 | 8/2001 | Geile et al. |
| 6,295,451 B1 | 9/2001 | Mimura |
| 6,307,869 B1 | 10/2001 | Pawelski |
| 6,317,599 B1 | 11/2001 | Rappaport et al. |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,353,600 B1 | 3/2002 | Schwartz et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,405,018 B1 | 6/2002 | Reudink et al. |
| 6,415,132 B1 | 7/2002 | Sabat, Jr. |
| 6,421,327 B1 | 7/2002 | Lundby |
| 6,448,558 B1 | 9/2002 | Greene |
| 6,452,915 B1 | 9/2002 | Jorgensen |
| 6,480,702 B1 | 11/2002 | Sabat, Jr. |
| 6,496,290 B1 | 12/2002 | Lee |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,551,065 B2 | 4/2003 | Lee |
| 6,580,402 B2 | 6/2003 | Navarro et al. |
| 6,580,905 B1 | 6/2003 | Naidu et al. |
| 6,587,514 B1 | 7/2003 | Wright et al. |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,678,509 B2 | 1/2004 | Skarman et al. |
| 6,704,298 B1 | 3/2004 | Matsumiya et al. |
| 6,745,013 B1 | 6/2004 | Porter et al. |
| 6,763,226 B1 | 7/2004 | McZeal, Jr. |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler |
| 6,876,056 B2 | 4/2005 | Tilmans et al. |
| 6,882,311 B2 | 4/2005 | Walker et al. |
| 6,885,344 B2 | 4/2005 | Mohamadi |
| 6,919,858 B2 | 7/2005 | Rofougaran |
| 6,931,659 B1 | 8/2005 | Kinemura |
| 6,934,511 B1 | 8/2005 | Lovinggood et al. |
| 6,934,541 B2 | 8/2005 | Miyatani |
| 6,941,112 B2 | 9/2005 | Hasegawa |
| 6,961,312 B2 | 11/2005 | Kubler et al. |
| 6,977,502 B1 | 12/2005 | Hertz |
| 7,015,826 B1 | 3/2006 | Chan et al. |
| 7,020,488 B1 | 3/2006 | Bleile et al. |
| 7,024,166 B2 | 4/2006 | Wallace et al. |
| 7,039,399 B2 | 5/2006 | Fischer |
| 7,043,271 B1 | 5/2006 | Seto et al. |
| 7,050,017 B2 | 5/2006 | King et al. |
| 7,053,838 B2 | 5/2006 | Judd |
| 7,069,577 B2 | 6/2006 | Geile et al. |
| 7,072,586 B2 | 7/2006 | Aburakawa et al. |
| 7,103,119 B2 | 9/2006 | Matsuoka et al. |
| 7,103,377 B2 | 9/2006 | Bauman et al. |
| 7,110,795 B2 | 9/2006 | Doi |
| 7,142,125 B2 | 11/2006 | Larson et al. |
| 7,142,535 B2 | 11/2006 | Kubler et al. |
| 7,142,619 B2 | 11/2006 | Sommer et al. |
| 7,144,255 B2 | 12/2006 | Seymour |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,269,311 B2 | 9/2007 | Kim et al. |
| 7,315,735 B2 | 1/2008 | Graham |
| 7,359,647 B1 | 4/2008 | Faria et al. |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,388,892 B2 | 6/2008 | Nishiyama et al. |
| 7,392,025 B2 | 6/2008 | Rooyen et al. |
| 7,412,224 B2 | 8/2008 | Kotola et al. |
| 7,450,853 B2 | 11/2008 | Kim et al. |
| 7,451,365 B2 | 11/2008 | Wang et al. |
| 7,454,171 B2 | 11/2008 | Palin et al. |
| 7,460,507 B2 | 12/2008 | Kubler et al. |
| 7,469,105 B2 | 12/2008 | Wake et al. |
| 7,483,711 B2 | 1/2009 | Burchfiel |
| 7,486,782 B1 | 2/2009 | Roos |
| 7,505,747 B2 | 3/2009 | Solum |
| 7,512,419 B2 | 3/2009 | Solum |
| 7,515,526 B2 | 4/2009 | Elkayam et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,551,641 B2 | 6/2009 | Pirzada et al. |
| 7,557,758 B2 | 7/2009 | Rofougaran |
| 7,580,384 B2 | 8/2009 | Kubler et al. |

(56) References Cited

U.S. PATENT DOCUMENTS

| | | |
|---|---|---|
| 7,586,861 B2 | 9/2009 | Kubler et al. |
| 7,587,559 B2 | 9/2009 | Brittain et al. |
| 7,599,420 B2 | 10/2009 | Forenza et al. |
| 7,610,046 B2 | 10/2009 | Wala |
| 7,619,535 B2 | 11/2009 | Chen et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,812,766 B2 | 10/2010 | Leblanc et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,852,228 B2 | 12/2010 | Teng et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,428 B2 | 6/2011 | Lin et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,157 B2 | 10/2011 | Hanabusa et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,155,525 B2 | 4/2012 | Cox |
| 8,270,838 B2 | 9/2012 | Cox |
| 8,306,563 B2 | 11/2012 | Zavadsky et al. |
| 8,328,145 B2 | 12/2012 | Smith |
| 8,406,941 B2 | 3/2013 | Smith |
| 8,417,979 B2 | 4/2013 | Maroney |
| 8,457,562 B2 | 6/2013 | Zavadsky et al. |
| 8,514,092 B2 | 8/2013 | Cao et al. |
| 8,532,492 B2 | 9/2013 | Palanisamy et al. |
| 8,548,330 B2 | 10/2013 | Berlin et al. |
| 8,588,614 B2 | 11/2013 | Larsen |
| 8,620,375 B2 | 12/2013 | Kim et al. |
| 8,649,684 B2 | 2/2014 | Casterline et al. |
| 8,744,390 B2 | 6/2014 | Stratford |
| 8,831,428 B2 | 9/2014 | Kobyakov et al. |
| 8,831,593 B2 | 9/2014 | Melester et al. |
| 8,930,736 B2 | 1/2015 | James |
| 9,160,449 B2 | 10/2015 | Heidler et al. |
| 2001/0036199 A1 | 11/2001 | Terry |
| 2002/0051434 A1 | 5/2002 | Ozluturk et al. |
| 2002/0097031 A1 | 7/2002 | Cook et al. |
| 2002/0123365 A1 | 9/2002 | Thorson et al. |
| 2003/0111909 A1 | 6/2003 | Liu et al. |
| 2003/0146765 A1 | 8/2003 | Darshan et al. |
| 2003/0147353 A1 | 8/2003 | Clarkson et al. |
| 2004/0095907 A1 | 5/2004 | Agee et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2004/0203704 A1 | 10/2004 | Ommodt et al. |
| 2004/0230846 A1 | 11/2004 | Mancey et al. |
| 2005/0047030 A1 | 3/2005 | Lee |
| 2005/0147071 A1 | 7/2005 | Karaoguz et al. |
| 2005/0226625 A1 | 10/2005 | Wake et al. |
| 2005/0272439 A1 | 12/2005 | Picciriello et al. |
| 2006/0053324 A1 | 3/2006 | Giat et al. |
| 2006/0084379 A1 | 4/2006 | O'Neill |
| 2006/0192434 A1 | 8/2006 | Vrla et al. |
| 2006/0274704 A1 | 12/2006 | Desai et al. |
| 2007/0004467 A1 | 1/2007 | Chary |
| 2007/0058332 A1 | 3/2007 | Canterbury et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0224954 A1 | 9/2007 | Gopi |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0043714 A1 | 2/2008 | Pernu |
| 2008/0044186 A1 | 2/2008 | George et al. |
| 2008/0045271 A1* | 2/2008 | Azuma ............... H04W 52/143 455/561 |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0166094 A1 | 7/2008 | Bookbinder et al. |
| 2008/0167931 A1 | 7/2008 | Gerstemeier et al. |
| 2008/0186143 A1 | 8/2008 | George et al. |
| 2008/0207253 A1 | 8/2008 | Jaakkola et al. |
| 2008/0251071 A1 | 10/2008 | Armitstead et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0149221 A1 | 6/2009 | Liu et al. |
| 2009/0169163 A1 | 7/2009 | Abbott, III et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2010/0002626 A1 | 1/2010 | Schmidt et al. |
| 2010/0027443 A1 | 2/2010 | LoGalbo et al. |
| 2010/0054746 A1 | 3/2010 | Logan |
| 2010/0056184 A1 | 3/2010 | Vakil et al. |
| 2010/0056200 A1 | 3/2010 | Tolonen |

(56) References Cited

U.S. PATENT DOCUMENTS

| | | |
|---|---|---|
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0290787 A1 | 11/2010 | Cox |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0055861 A1 | 3/2011 | Covell et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0105110 A1 | 5/2011 | Carmon et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158536 A1 | 6/2011 | Djadi et al. |
| 2011/0172841 A1 | 7/2011 | Forbes, Jr. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0009926 A1 | 1/2012 | Hevizi et al. |
| 2012/0033676 A1 | 2/2012 | Mundra et al. |
| 2012/0099448 A1 | 4/2012 | Matsuo et al. |
| 2012/0106442 A1 | 5/2012 | Xiao |
| 2012/0120995 A1 | 5/2012 | Wurth |
| 2012/0122405 A1 | 5/2012 | Gerber et al. |
| 2012/0163829 A1 | 6/2012 | Cox |
| 2012/0196611 A1 | 8/2012 | Venkatraman et al. |
| 2012/0214538 A1 | 8/2012 | Kim et al. |
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0132683 A1 | 5/2013 | Ajanovic et al. |
| 2013/0188959 A1 | 7/2013 | Cune et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0249292 A1 | 9/2013 | Blackwell, Jr. et al. |
| 2013/0295980 A1 | 11/2013 | Reuven et al. |
| 2013/0330086 A1 | 12/2013 | Berlin et al. |
| 2013/0337750 A1 | 12/2013 | Ko |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0097846 A1 | 4/2014 | Lemaire et al. |
| 2014/0146692 A1 | 5/2014 | Hazani et al. |
| 2014/0148214 A1 | 5/2014 | Sasson |
| 2014/0153919 A1 | 6/2014 | Casterline et al. |
| 2014/0169246 A1 | 6/2014 | Chui et al. |
| 2014/0233442 A1 | 8/2014 | Atias et al. |
| 2014/0293894 A1 | 10/2014 | Saban et al. |
| 2014/0308043 A1 | 10/2014 | Heidler et al. |
| 2014/0308044 A1 | 10/2014 | Heidler et al. |
| 2015/0098350 A1* | 4/2015 | Mini ............... H04W 24/10 370/252 |
| 2015/0249513 A1* | 9/2015 | Schwab ........... H04L 5/1469 370/278 |

FOREIGN PATENT DOCUMENTS

| | | |
|---|---|---|
| CN | 101803246 A | 8/2010 |
| CN | 101876962 A | 11/2010 |
| EP | 0851618 A2 | 7/1998 |
| EP | 0924881 A2 | 6/1999 |
| EP | 1227605 A2 | 7/2002 |
| EP | 1347584 A2 | 9/2003 |
| EP | 1954019 A1 | 8/2008 |
| GB | 2275834 A | 9/1994 |
| JP | 58055770 A | 4/1983 |
| JP | 2002353813 A | 12/2002 |
| KR | 20040053467 A | 6/2004 |
| KR | 1031619 B1 | 4/2011 |
| WO | 9603823 A1 | 2/1996 |
| WO | 0072475 A1 | 11/2000 |
| WO | 0184760 A1 | 11/2001 |
| WO | 03024027 A1 | 3/2003 |
| WO | 2005117337 A1 | 12/2005 |
| WO | 2006077569 A1 | 7/2006 |
| WO | 2006077570 A1 | 7/2006 |
| WO | 2008083317 A1 | 7/2008 |
| WO | 2009014710 A1 | 1/2009 |
| WO | 2009145789 A1 | 12/2009 |
| WO | 2010090999 A1 | 8/2010 |
| WO | 2010132292 A1 | 11/2010 |
| WO | 2011123314 A1 | 10/2011 |
| WO | 2012051227 A1 | 4/2012 |
| WO | 2012051230 A1 | 4/2012 |
| WO | 2012064333 A1 | 5/2012 |
| WO | 2012071367 A1 | 5/2012 |
| WO | 2012103822 A2 | 8/2012 |
| WO | 2015049671 A2 | 4/2015 |

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Author Unknown, "INT6400/INT1400: HomePlug AV Chip Set," Product Brief, Atheros Powerline Technology, 27003885 Revision 2, Atheros Communications, Inc., 2009, 2 pages.

(56) References Cited

OTHER PUBLICATIONS

Author Unknown, "MegaPlug AV: 200 Mbps Ethernet Adapter," Product Specifications, Actiontec Electronics, Inc., 2010, 2 pages.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
International Preliminary Report on Patentability for PCT/US2011/061761 mailed May 28, 2013, 8 pages.
International Search Report for PCT/US2011/061761 mailed Jan. 26, 2012, 3 pages.
International Search Report for PCT/US2010/056458 mailed Aug. 2, 2011, 4 pages.
International Preliminary Report on Patentability for PCT/US2010/056458 mailed May 23, 2013, 9 pages.
Non-final Office Action for U.S. Appl. No. 13/410,916 mailed Jul. 18, 2012, 13 pages.
Notice of Allowance for U.S. Appl. No. 13/410,916 mailed Aug. 9, 2012, 9 pages.
Author Unknown, "MDS SDx Packaged Stations," Technical Manual, MDS 05-6312A01, Revision B, May 2011, GE MDS, LLC, Rochester, New York, 44 pages.
Author Unknown, "Quad Integrated IEEE 802.3at PSE Controller and Power Management System with up to 30W per Port Capabilities," Product Brief, BCM59103, Broadcom Corporation, Oct. 12, 2009, 2 pages.
Author Unknown, "Quad IEEE 802.3at Power Over Ethernet Controller," Product Brief, LTC4266, Linear Technology Corporation, 2009, 2 pages.
Author Unknown, "Single IEEE 802.3at Power Over Ethernet Controller," Product Brief, LTC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
International Search Report for PCT/US2010/034005 mailed Aug. 12, 2010, 4 pages.
International Preliminary Report on Patentability for PCT/US2010/034005 mailed Nov. 24, 2011, 7 pages.
International Search Report for PCT/US2011/055858 mailed Feb. 7, 2012, 4 pages.
International Preliminary Report on Patentability for PCT/US2011/055858 mailed Apr. 25, 2013, 8 pages.
International Search Report for PCT/US2011/055861 mailed Feb. 7, 2012, 4 pages.
International Preliminary Report on Patentability for PCT/US2011/055861 mailed Apr. 25, 2013, 9 pages.
International Preliminary Report on Patentability for PCT/US2011/061761 mailed Jun. 6, 2013, 9 pages.
Translation of the the First Office Action for Chinese Patent Application No. 201180059270.4 issued May 13, 2015, 19 pages.
International Search Report for PCT/US2013/058937 mailed Jan. 14, 2014, 4 pages.
International Preliminary Report on Patentability for PCT/US2013/058937 mailed Apr. 9, 2015, 7 pages.
Non-final Office Action for U.S. Appl. No. 13/626,371 mailed Dec. 13, 2013, 15 pages.
Non-final Office Action for U.S. Appl. No. 13/626,371 mailed Jun. 25, 2014, 16 pages.
Notice of Allowance for U.S. Appl. No. 13/626,371 mailed Nov. 25, 2014, 7 pages.
Notice of Allowance for U.S. Appl. No. 13/626,371 mailed Aug. 3, 2015, 7 pages.
Non-final Office Action for U.S. Appl. No. 13/859,985 mailed Feb. 27, 2015, 15 pages.
Final Office Action for U.S. Appl. No. 13/859,985 mailed Jul. 22, 2015, 8 pages.
Non-final Office Action for U.S. Appl. No. 13/860,017 mailed Feb. 27, 2015, 15 pages.
Final Office Action for U.S. Appl. No. 13/860,017 mailed Jul. 23, 2015, 8 pages.
Non-Final Office Action for U.S. Appl. No. 13/950,397, mailed Mar. 17, 2015, 6 pages.
Notice of Allowance for U.S. Appl. No. 13/950,397, mailed Jun. 10, 2015, 7 pages.
Non-Final Office Action for U.S. Appl. No. 13/771,756 mailed Sep. 10, 2014, 26 pages.
Final Office Action for U.S. Appl. No. 13/771,756 mailed Apr. 30, 2015, 38 pages.
International Search Report for PCT/IL2013/050976, mailed Mar. 18, 2014, 3 pages.
Translation of the First Office Action for Chinese Patent Application No. 201180053270.3 issued May 26, 2015, 17 pages.
Translation of the First Office Action for Chinese Patent Application No. 201180052537.7 issued Jun. 25, 2015, 9 pages.
Non-final Office Action for U.S. Appl. No. 13/687,457 mailed Jul. 30, 2015, 12 pages.
Advisory Action for U.S. Appl. No. 13/771,756, mailed Aug. 21, 2015, 4 pages.
Non-final Office Action for U.S. Appl. No. 13/899,118, mailed Jan. 6, 2016, 10 pages.
Non-final Office Action for U.S. Appl. No. 14/845,768, mailed Nov. 19, 2015, 12 pages.
Non-final Office Action for U.S. Appl. No. 14/845,946, mailed Dec. 17, 2015, 11 pages.
The Second Office Action for Chinese Patent Application No. 201180059270.4, mailed Jan. 28, 2016, 42 pages.
Final Office Action for U.S. Appl. No. 13/687,457, mailed Feb. 12, 2016, 22 pages.
Notice of Allowance for U.S. Appl. No. 13/771,756, mailed Jan. 29, 2016, 14 pages.
Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.html, 15 pages.
Advisory Action and Applicant-Initiated Interview Summary for U.S. Appl. No. 13/687,457, mailed May 13, 2016, 5 pages.
Non-final Office Action for U.S. Appl. No. 13/687,457, mailed Jun. 27, 2016, 30 pages.
Non-final Office Action for U.S. Appl. No. 13/899,118, mailed Jun. 30, 2016, 11 pages.
Notice of Allowance for U.S. Appl. No. 14/845,946, mailed Jun. 8, 2016, 7 pages.

* cited by examiner

PROTECTION OF DISTRIBUTED ANTENNA SYSTEMS

BACKGROUND

Field of the Disclosure

This disclosure relates generally to distributed antenna systems and, more particularly, to protecting distributed antenna systems from being electrically over powered.

Technical Background

A distributed antenna system (DAS) typically includes a plurality of spaced apart antennas configured for extending radio frequency (RF) antenna coverage of an associated system. For example, a DAS may be associated with a cellular system, a "wireless fidelity" or "WiFi" system, or a wireless local area network (WLAN) by coupling the DAS to a base transceiver station (BTS) that may be in the form of a cellular base station, a WiFi base station, or a WLAN base station. As one specific example, when cellular service is not available within the interior of a building, a DAS may be installed in the interior of the building and coupled to the antenna port or ports of a cellular BTS that may be installed in the building, for providing cellular service within the interior of the building.

In active DAS networks, the DAS being coupled to a BTS typically comprises a downlink interface being used for interfacing the BTS to the DAS. The downlink interface usually includes devices such as duplexers, amplifiers and variable attenuators. A typical downlink interface can withstand power levels of only up to few watts, and the normal operation range of the downlink interface is usually below one watt (30 dBm). However, the maximum output power of a standard cellular BTS may reach twenty Watts (43 dBm) or even more. Therefore, a cellular BTS interfaced to an active DAS is typically configured to operate with low output power to match the operational range of the downlink interface, which is usually lower than one watt (30 dBm). However, due to human mistakes or technical failures, the BTS might start transmitting its maximum output power and the downlink interface may be damaged.

SUMMARY

An embodiment of this disclosure relates at least one circuit for protecting at least one device of a DAS from being over powered by downlink RF signals that may originate from a BTS. The DAS may include at least one downlink RF interface configured to receive the downlink RF signals and distribute the downlink RF signals over at least one downlink communications medium to one or more remote antenna units (RAUs). The at least one protection circuit may be communicatively coupled to the at least one downlink RF interface. The at least one protection circuit may be configured for detecting electrical power of at least a portion of (e.g., a sample portion of) the downlink RF signals, and diverting a substantial portion of the downlink RF signals away from the at least one downlink RF interface in response to the detected electrical power being equal to or greater than a predetermined electrical power.

The downlink RF signals diverted away from the at least one downlink RF interface may be routed to an electrical load (e.g., "dummy load"). The predetermined electrical power may be indicative of electrical power of the downlink RF signals being in a range from about 0.1 watts to about 100 watts, or more specifically about 0.5 watts to about 20 watts, although other predetermined electrical powers are within the scope of this disclosure. The at least one protection circuit may be configured for handling/diverting up to about 100 watts away from the at least one downlink RF interface in response to the detected electrical power being equal to or greater than the predetermined electrical power. The at least one protection circuit may include hysteresis, wherein the diverting mechanism is activated in response to a detected electrical power being equal or higher than a first predetermined electrical power, but once the diverting mechanism is activated it will not be released until the detected electrical power goes below a second predetermined electrical power that is less than the first predetermined electrical power.

The at least one protection circuit may include at least one power detector for detecting the electrical power of the at least a portion of the downlink RF signals, at least one comparator operatively associated with the at least one power detector for determining whether the detected electrical power is equal to or greater than the predetermined electrical power, and at least one RF switch operatively associated with the at least one comparator for diverting the downlink RF signals away from the at least one downlink RF interface in response to the at least one comparator determining that the detected electrical power is equal to or greater than the predetermined electrical power. A digital to analog converter may be coupled to a first port of the comparator, and the power detector may be coupled to a second port of the comparator. The at least one protection circuit may further include coupler(s), combiners(s) and/or other suitable features.

An embodiment of this disclosure comprises a method of operating a distributed antenna apparatus. The method may include receiving downlink RF signals, detecting electrical power of at least a portion of the downlink RF signals, and distributing a substantial portion of the downlink RF signals over at least one downlink communications medium to one or more RAUs in response to the detected electrical power being less than a predetermined electrical power. This and/or another method may further include not distributing the downlink RF signals over at least one downlink communications medium to one or more RAUs in response to the detected electrical power being equal to or greater than the predetermined electrical power or another suitable amount of electrical power. The step of not distributing may comprise diverting a substantial portion of the downlink RF signals away from the at least one device of the distributed antenna apparatus. The substantial portion of the downlink RF signals may be diverted to an electrical load.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Figure 1:
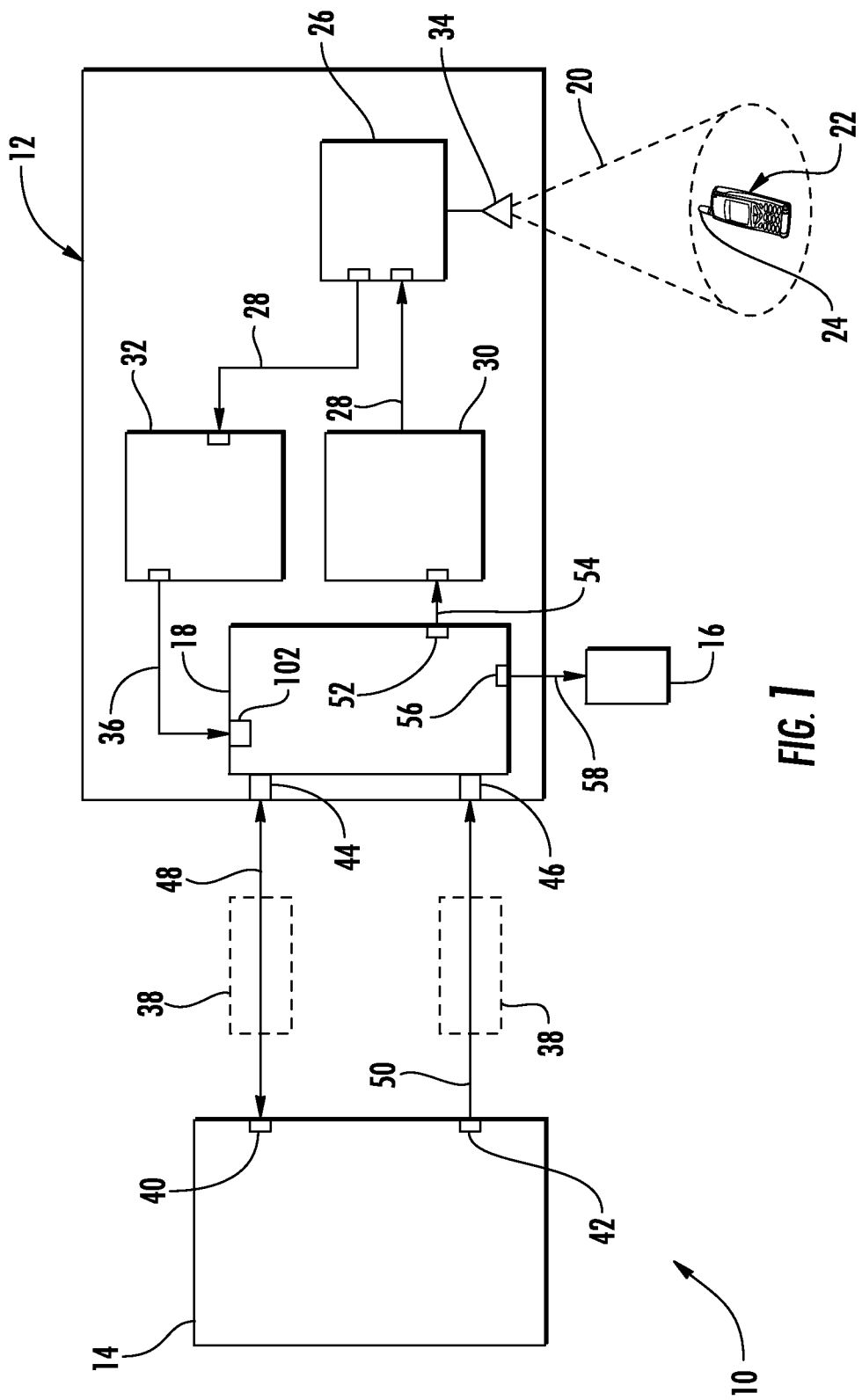
FIG. 1 is a block diagram that schematically illustrates a system including a DAS coupled to a BTS, wherein the DAS includes a protection circuit, in accordance with an embodiment of this disclosure.

FIG. 1 illustrates a composite electrical system 10 including a DAS 12 electrically coupled to both a conventional, cellular, base transceiver station BTS 14 and a conventional dummy load 16, in accordance with an embodiment of this disclosure. Except for having a protection circuit 18 associated therewith, the DAS 12 or a substantial portion of the DAS may be conventional. The protection circuit 18 is configured for protecting the DAS 12 from being over powered by the BTS 14. Generally described and in accordance with one embodiment, the protection circuit 18 is configured for identifying a situation in which the BTS 14 transmits sufficiently high electrical power (e.g., greater than or equal to predetermined electrical power) for at least potentially over powering (e.g., damaging) at least one sensitive device of the DAS 12, wherein in response to that situation the protection circuit diverts the high power from the BTS to the dummy load 16 instead of allowing the high power from the BTS to reach the at least one sensitive device of the DAS 12. The at least one sensitive device of the DAS 12 may be an RF downlink interface 30, as will be discussed in greater detail below The DAS 12 of the embodiment shown the drawings may be an optical fiber-based DAS configured to create one or more antenna coverage areas 20 for establishing RF wireless communications with wireless devices 22 located in the RF range of the antenna coverage areas. Each of the wireless devices 22 may be any suitable device capable of receiving and/or transmitting wireless RF communication signals. As an example, a device 22 may be a conventional cellular phone having a combination of features including an antenna 24, wherein the combination of features is adapted to receive and/or send electromagnetic RF signals. Whereas the embodiment shown in the drawings is discussed in this Detailed Description section of this disclosure primarily in the context of the DAS 12 being coupled to the cellular BTS 14, alternatively the DAS may be coupled to a WiFi BTS, a WLAN BTS and/or any other suitable BTS.

With continued reference to FIG. 1, features of the optical fiber-based DAS 12 that may be conventional can include one or more RAUs 26 coupled by one or more optical fiber communications mediums 28 to at least one RF downlink interface 30 and at least one RF uplink interface 32. The downlink and uplink interfaces 30, 32 may be referred to as head-end equipment or parts of a head-end unit. The RAU 26 is a type of remote communications unit. In general, a remote communications unit may support wireless communications, wired communications, or both. Accordingly, the RAU 26 can support wireless communications and may also support wired communications. As shown in FIG. 1, the RAU 26 includes an antenna 34 for providing the antenna coverage area 20. Alternatively or more generally, the downlink and uplink communications medium(s) 28 may be any mediums, including but not limited to electrical conductor, optical fiber, and air (i.e., wireless transmission). As more specific examples regarding features of the DAS, each of U.S. Pat. No. 8,548,330 and US 2014/0050482 is incorporated herein by reference in its entirety.

The protection circuit 18 may also be characterized as being head-end equipment or part of a head-end unit. On the other hand, the protection circuit 18 may be characterized as being a separate feature from the head-end equipment or unit. Similarly, whereas the protection circuit 18 is schematically shown in FIG. 1 as being part of or encompassed by the DAS 12, the protection circuit may alternatively be characterized as being, or may be positioned so as to be, outside of the DAS.

Generally described, the downlink interface 30 receives downlink electrical RF signals from the BTS 14 by way of the protection circuit 18, and the protection circuit is configured in a manner that seeks to prevent the downlink interface 30 from being over powered by the BTS 14, as will be discussed in greater detail below. In one embodiment, the downlink interface 30 is configured to convert the downlink electrical RF signals it receives into corresponding downlink optical RF signals and provide those downlink optical RF signals to the RAU 26 over at least one of the optical fiber communication mediums 28. Conversely and in the same embodiment, the uplink interface 32 is configured to receive uplink optical RF signals from the RAU 26 over at least one of the optical fiber communication mediums 28, and convert the uplink optical RF signals it receives into uplink electrical RF signals. The uplink interface 32 is configured to provide the uplink electrical RF signals to the BTS 14 at least partially by way of an electrical communication path 36, as will be discussed in greater detail below.

The downlink interface 30 may include devices such as duplexers, amplifiers, variable attenuators and/or other suitable features for interfacing the BTS 14 to the DAS 12. The downlink interface 30 may be able to withstand power levels of only up to few watts, and the operation range of the downlink interface may be below one watt (30 dBm), although differently configured interfaces are within the scope of this disclosure. In contrast, if unrestricted, the maximum output power of the BTS 14 may reach twenty Watts (43 dBm) or even more, although differently configured BTSs are within the scope of this disclosure. Accordingly, the protection circuit 18 seeks to protect the downlink interface 30 from being electrically over powered by the BTS 14. More specifically, the protection circuit 18 may be configured for identifying a situation in which the BTS 14 transmits electrical power greater than or equal to predetermined electrical power that may potentially over power the downlink interface 30, wherein in response to that situation the protection circuit diverts the downlink electrical RF signals to the dummy load 16. The predetermined electrical power/power at which the protection circuit 18 diverts the downlink electrical RF signals to the dummy load 16 may be in a range from about 0.1 watts to about 100 watts, a range from about 0.5 watts to about 20 watts, or any other subranges therebetween. In one specific example, the protection circuit 18 is configured so that it is capable of diverting downlink electrical RF signals of up to about 100 watts to the dummy load 16, although other maximum downlink electrical RF signals are within the scope of this disclosure.

Optionally such as for redundancy, protecting features in addition to the protection circuit 18 may be included in the composite system 10 in an effort to prevent the downlink interface 30 from being electrically over powered. For example, one or more electrical attenuators 38 may be interposed between the BTS 14 and the downlink interface 30 in a manner that seeks to prevent the downlink interface from being electrically over powered and/or the BTS 14 may be configured to operate with low output power in a manner that seeks to prevent the downlink interface 30 from being electrically over powered. However, one or more of the optional other protecting features may be omitted from the composite system 10, such as in response to equipment failure or human error.

More specifically regarding the electrical connections between the BTS 14 and the DAS 12, as shown in FIG. 1 the BTS may have one or more RF ports 40, 42 that respectively provide downlink electrical RF signals to one or more RF ports 44, 46 of the DAS 12 by way of one or more respective electrical communication paths 48, 50. One of the BTS' ports 40, 42 may be a duplexed port 40 that provides downlink electrical RF signals to the DAS 12 and receives at the same port the uplink electrical RF signals from the DAS 12. The other of the BTS' ports 40, 42 may be a DL simplex port 42 that provides downlink electrical RF signals to the DAS 12 without receiving uplink electrical RF signals from the DAS 12. One of the DAS' ports 44, 46 may be a duplex port 44 that receives the respective downlink electrical RF signals and provides the respective uplink electrical RF signals. The other of the DAS' ports 44, 46 may be a simplex port 46 that that receives the respective downlink electrical RF signals. If the one or more attenuators 38 are present, they may be respectively incorporated into the electrical communication paths 48, 50.

The DAS' ports 44, 46 may be respectively electrically coupled to ports of the protection circuit 18 and/or the DAS' ports 44, 46 may be characterized as being the ports 44, 46 of the protection circuit, or the like. The electrical communication path 36 from the DAS' uplink interface 32 may be coupled to the protection circuit's duplex port 102, or the uplink electrical RF signals from the DAS' uplink interface 32 may be provided to the BTS 14 in any other suitable manner.

The protection circuit 18 may further include an RF pass-through port 52 coupled by an electrical communication path 54 to a respective RF input port of the downlink interface 30. The protection circuit 18 may further include an RF diversion port 56 coupled by an electrical communication path 58 to an RF port of the dummy load 16. The dummy load 16 may be a conventional electrical load. More specifically, the dummy load 16 may provide a fifty Ohm resistive load, or any other suitable load. The dummy load 16 may also be referred to a high power termination, or more specifically a high power fifty Ohm termination.

In the embodiment shown in the drawings, the protection circuit 18 is positioned between the DAS' ports 44, 46 and the downlink interface 30 so that the protection circuit may be characterized as protecting both of the DAS' ports 44, 46. Alternatively although not shown in the drawings, the protection circuit 18 may be configured for protecting only one of the DAS' ports 44, 46, and/or a first protection circuit 18 may be configured for protecting only the DAS' duplex port 44 and a second protection circuit 18 may be configured for protecting only the DAS' simplex port 46.

Figure 2:
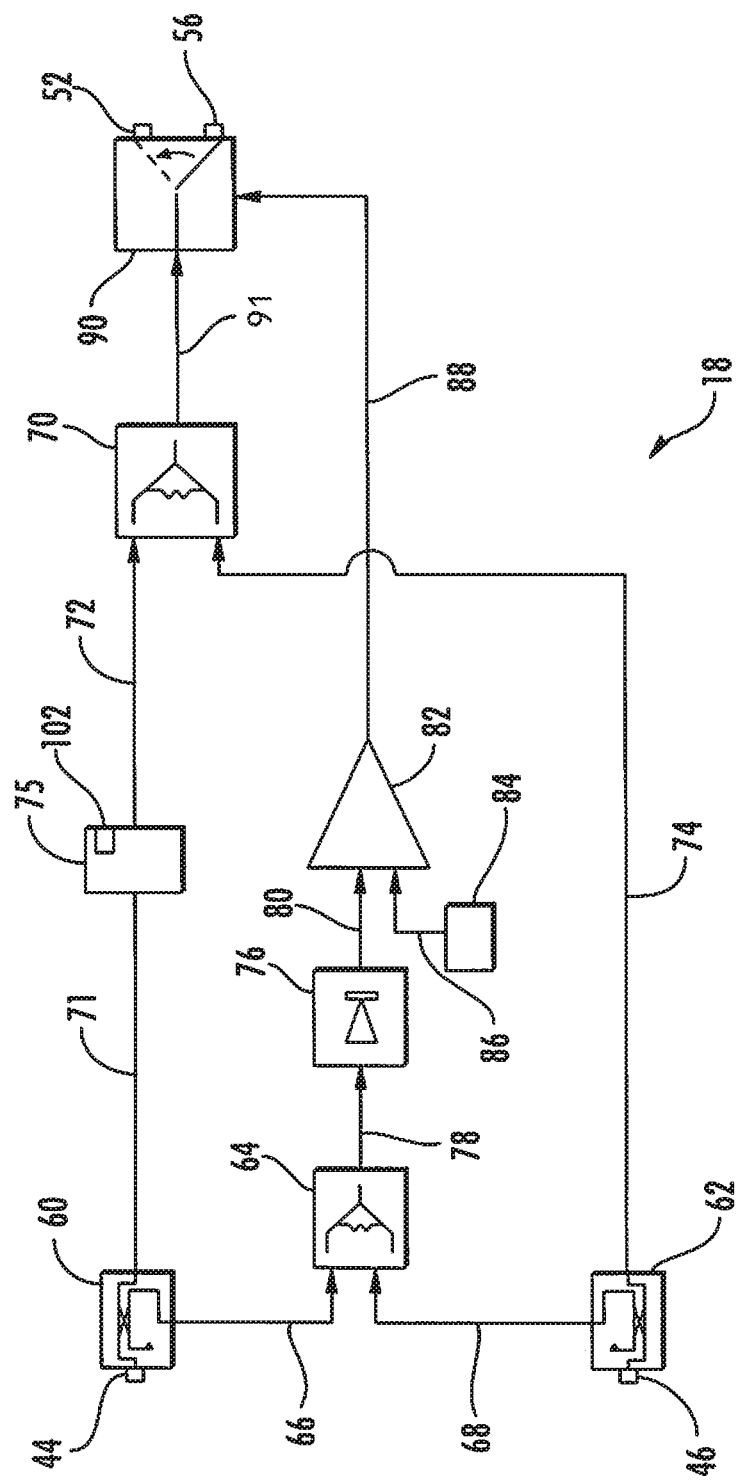
FIG. 2 is a block diagram that schematically illustrates at least the protection circuit of FIG. 1, in accordance with an embodiment of this disclosure.

As shown in FIG. 2, the protection circuit 18 includes RF directional couplers 62, 60 configured for splitting off a portion or sample (e.g., sample portion) of the downlink electrical RF signals, and passing on the remainder (e.g., remainder portion) of the downlink electrical RF signals. The ports 44, 46 may be respectively electrically coupled to ports of the couplers 60, 62 and/or the DAS' ports 44, 46 may be characterized as respectively being the input ports 44, 46 of the couplers 60, 62. The coupled ports of the couplers 60, 62 are respectively coupled to RF input ports of an RF electrical combiner 64 by electrical communication paths 66, 68, for respectively providing first and second portions (e.g., sample portions) of the downlink electrical RF signals to the electrical combiner 64. The RF transmitted ports of the couplers 60, 62 are respectively coupled to RF input ports of an RF electrical combiner 70 by electrical communication paths 71, 72, 74 and duplexer 75 for providing third and fourth portions (e.g., remainder portions) of the downlink electrical RF signals to the electrical combiner 70.

The RF output port of the electrical combiner 64 is coupled to an RF input port of a power detector 76 by an electrical communication path 78, for providing the respective sample portion of the downlink electrical RF signals to the power detector. The output of the power detector 76 is a voltage that is relative to (e.g., may be proportional to) the input power (i.e., both the power of the respective sample portion of the downlink electrical RF signals supplied to the input port of the power detector 76, and the total power of the downlink electrical RF signals provided by the BTS 14). When the input power supplied to the power detector 76 increases, the output voltage of the power detector increases proportionally.

The output port of the power detector 76 is coupled to a negative input port of an analog comparator 82 by an electrical path 80. The comparator 82 may more specifically be an operational amplifier voltage comparator. A digital to analog converter (D/A converter) 84 may be coupled to a positive port of the comparator 82 by an electrical communication path 86. The D/A converter 84 is for providing a voltage to the positive port of the comparator 82 by way of the electrical communication path 86.

The D/A converter 84 is configured to produce a voltage proportional to the maximum electrical power that can safely be received at the RF input port of the downlink interface 30, or a voltage proportional to a percentage of the maximum electrical power that can safely be received at the RF input port of the downlink interface, wherein the percentage may be based upon factors related to operability of the DAS 12 and the amount of risk that the responsible person(s) are willing to take with regard to the possibility of overpowering the DAS. The voltage provided by the D/A converter 84 may be adjustable. Although this example is based on providing a reference voltage to the comparator 82 by means of a D/A converter 84, this reference voltage can be obtained using other suitable means, such as a potentiometer.

The output of the comparator 82 is coupled to a control port of an RF switch 90 (e.g., a solid state relay) by an electrical communication path 88, so that the output of the comparator is the control input of the switch. The RF output port of the electrical combiner 70 is coupled to an RF input port of the switch 90 by an electrical communication path 91, for providing the incoming power from the BTS 14, or more specifically the remainder portion of the downlink electrical RF signals from the electrical combiner 70, to the switch. Each of the above-discussed electrical communication paths of the system 10 and protection circuit 18 typically comprises, consists essentially of, or consists of electrical conductor(s) for communicatively coupling respective devices, although any suitable communication paths and/or communicative couplings may be used.

In one embodiment, the couplers 60, 62 are configured so that the respective sample portion of the downlink electrical RF signals is a relatively small percentage of the downlink electrical RF signals provided by the BTS 14, and the remainder portion of the downlink electrical RF signals is a relatively large percentage of the downlink electrical RF signals provided by the BTS. Accordingly, the remainder portion of the downlink electrical RF signals may be a substantial portion of the downlink electrical RF signals provided by the BTS 14. In one example, the respective sample portion of the downlink electrical RF signals provided to the combiner 64 may be may be about 1% of the downlink electrical RF signals provided by the BTS 14, such that the remainder portion of the downlink electrical RF signals provided to the combiner 70 is about 99% of the downlink electrical RF signals provided by the BTS 14.

Generally described and in accordance with an embodiment of this disclosure, the couplers 60, 62 sample the power (i.e., the downlink electrical RF signals) from the BTS 14, and the sampled power is provided to the power detector 76. The power detector 76 generates an output voltage that is proportional to the sampled power. The analog comparator 82 compares the output voltage from the power detector 76 to a predetermined threshold voltage, wherein the predetermined threshold voltage is provided by the D/A converter 84 and represents, reflects and/or is indicative of the maximum allowed power from the BTS 14. Although this example is based on providing a reference voltage to the comparator 82 by means of a D/A converter 84, this reference voltage can be obtained using other suitable means, such as a potentiometer. For example, the output voltage from the power detector 76 may vary proportionally to the power of the downlink electrical RF signals provided by the BTS 14. If the sampled power is higher than the threshold, or more specifically if the output voltage from the power detector 76 is higher than the predetermined threshold voltage provided by the D/A converter 84, then the comparator 82 activates the RF switch 90 so that the switch diverts the power (i.e., the downlink electrical RF signals) to the dummy load 16 rather than allowing the power to reach the downlink interface 30 of the DAS 12, as will be discussed in greater detail below.

More specifically regarding the switch 90, it has at least two states and at least two corresponding RF output ports. The RF output ports of the switch 90 may be respectively electrically coupled to the output ports 52, 56 of the protection circuit 18 and/or the output ports of the switch may be characterized as being the protection circuit's output ports 52, 56. Referring to FIGS. 1 and 2, in one state of the switch 90, which may be referred to as a first state or a pass-through state, the incoming power from the BTS 14, or more specifically the remainder portion of the downlink electrical RF signals from the electrical combiner 70, is routed to the pass-through port 52 and from there to the RF input port of the downlink interface 30 of the DAS 12 by way of the electrical communication path 54. In another state of the switch 90, which may be referred to as a second state or a diversion state, the incoming power from the BTS 14, or more specifically the remainder portion of the downlink electrical RF signals from the electrical combiner 70, is routed to the diversion port 56 and from there to the RF port of the dummy load 16 by way of the electrical communication path 58.

In accordance with an embodiment of this disclosure, the protection circuit 18 is configured so that as long as the output voltage of the power detector 76 is lower than the voltage provided by the D/A converter 84, the output of the comparator 82 "commands" the switch 90 to route the incoming power, or more specifically the remainder portion of the downlink electrical RF signals from the electrical combiner 70, to the RF input port of the downlink interface 30. In contrast, if the output voltage of power detector 76 is higher than the voltage provided by the D/A converter 84, then the input power from the BTS 14 is higher than allowed and the comparator 82 will change its output state and will command the switch 90 to change its state and route the incoming power from the BTS, or more specifically the remainder portion of the downlink electrical RF signals from the electrical combiner 70, to the dummy load 16. In addition to controlling the switch 90, the output of the comparator 82 may also activate an alarm in response to the output voltage of power detector 76 being higher than the voltage provided by the D/A converter 84 (i.e., in response to the input power from the BTS 14 being higher than allowed), wherein the alarm that may be communicated to a control center to inform a maintenance team, or the like, that the BTS 14 is providing higher than expected power, or the like.

The threshold voltage provided by the D/A converter 84 to the positive port of the comparator 82 may be configured by the installer of the DAS 12, or by the installer of the protection circuit 18, or the like, based upon the capabilities of the downlink interface 30 or other considerations. For example and at least partially reiterating from above, the D/A converter 84 is typically configured so that the voltage it provides may be proportional to the maximum electrical power that can safely be received at the RF input port of the downlink interface 30, or the voltage from the D/A converter may be proportional to a percentage of the maximum electrical power that can safely be received at the RF input port of the downlink interface, wherein the percentage may be based upon factors related to operability of the DAS 12 and the amount of risk that the responsible person(s) are willing to take with regard to the possibility of overpowering the DAS. The DAS 12 may also be referred to as a distributed antenna apparatus.

The comparator 82 may be configured to comprise or otherwise be associated with a hysteresis mechanism that seeks to avoid overly frequent cycling of the switch 90 between the pass-through and diversion states discussed above. More specifically, the hysteresis mechanism of or associated with the comparator 82 seeks to avoid an overly frequent cycling of the switch 90 in a situation in which the incoming power from the BTS 14 stabilizes at the threshold level such that any small change in the incoming power from the BTS 14 might cause the switch to toggle to another state.

Figure 3:
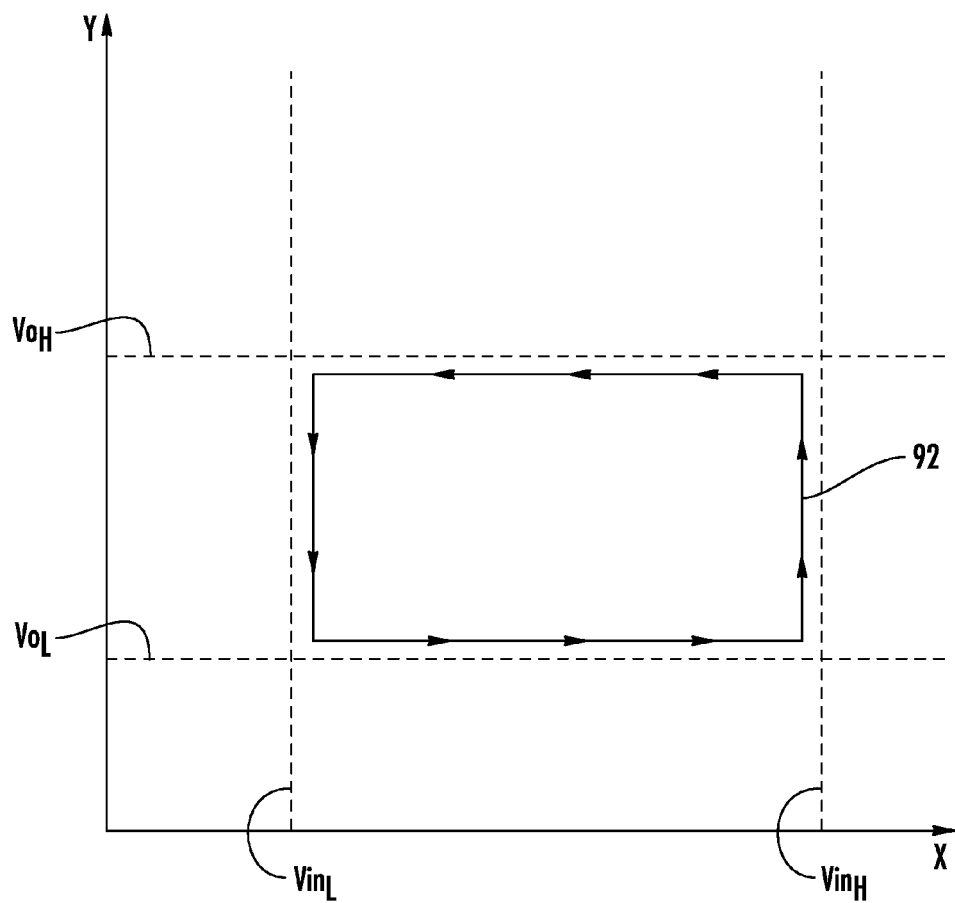
FIG. 3 schematically illustrates hysteresis features associated with a comparator of the protection circuit, in accordance with an embodiment of this disclosure.

The structure and operativeness of the hysteresis features are schematically illustrated by FIG. 3. FIG. 3 is chart illustrating a Cartesian or rectangular coordinate system, wherein the X axis represents the voltage supplied from the power detector 76 and input to the negative input port of the analog comparator 82, and the Y axis represents the voltage output from the comparator 82. In FIG. 3, "$Vo_L$" represents a relatively low value for the voltage output from the comparator 82, and "$Vo_H$" represents a relatively high value for the voltage output from the comparator 82. In the embodiment of this disclosure that is least partially schematically represented by FIG. 3, and as best understood with reference to FIGS. 2 and 3, the switch 90 is in its pass-through state while the voltage output from the comparator is $Vo_L$, and the switch 90 is in its diversion state while the voltage output from the comparator is $Vo_x$.

Regarding the voltage supplied from the power detector 76, in FIG. 3 "$Vin_L$" represents a relatively low value for the voltage input to the negative input port of the analog comparator 82, and "$Vin_H$" represents a relatively high value for the voltage input to the negative input port of the analog comparator 82. The difference between the lower-level trip value $Vin_L$ and the higher-level trip value $Vin_H$ equals the hysteresis voltage.

Referring to FIGS. 2 and 3, the hysteresis features of the comparator 82 of an embodiment of this disclosure are configured in a manner so that:

1) while the voltage being output from the comparator 82 is at or below the relative low value $Vo_L$ (and the voltage supplied by the D/A converter 84 to the positive input port of the comparator remains constant), the voltage being output from the comparator will transition to the relatively high value $Vo_H$ only in response to the voltage input to the negative input of the comparator rising above the relative high value $Vin_H$; and 2) while the voltage being output from the comparator 82 is at or above the relatively high value $Vo_H$ (and the voltage supplied by the D/A converter 84 to the positive input port of the comparator remains constant), the voltage being output from the comparator will transition to the relatively low value $Vo_L$ only in response to the voltage input to the negative input of the comparator falling below the relative low value $Vin_L$.

Accordingly, the hysteresis features of the comparator 82 are schematically illustrated by the hysteresis loop 92 of FIG. 3.

Described differently, the hysteresis features of the comparator 82 of an embodiment of this disclosure are configured in a manner so that:

1) as long as the output voltage of the power detector 76/the input voltage at the negative input port of the analog comparator 82 is less than $Vin_H$, the output of the comparator 82 is at $Vo_L$, and as a result the switch 90 is in its pass-through state for routing the power from the BTS 14 (e.g., at least the reminder portions of the downlink electrical RF signals) to the downlink interface 30 of the DAS 12;

2) when the output voltage of power detector 76/the input voltage at the negative input port of the analog comparator 82 becomes greater than $Vin_H$, the output of the comparator 82 moves to $Vo_H$, and as a result the switch 90 is toggled to its diversion state for routing the power from the BTS 14 (e.g., at least the reminder portions of the downlink electrical RF signals) to the dummy load 16, wherein the output of the comparator 82 remains at $Vo_x$ and the switch 90 remains in its diversion state as long as the output voltage of power detector 76/the input voltage at the negative input port of the analog comparator 82 is higher than $Vin_L$; and 3) then only when the output voltage of power detector 76/the input voltage at the negative input port of the analog comparator 82 gets below $Vin_L$ will the output of the comparator 82 change back to $Vo_H$ to cause the switch 90 to toggle back to its pass-through state for routing the power from the BTS 14 (e.g., at least the reminder portions of the downlink electrical RF signals) to the downlink interface 30 of the DAS 12.

In the embodiment shown in the drawings, at least a portion of the protection circuit 18 may be characterized as being a relatively fast and reliable analog circuit that operates without the involvement of a relatively slow microcontroller or other type of computer and associated software. Alternatively, the protection circuit 18 may be configured differently than shown in the drawings.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in any flow chart diagrams, or the like, may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A distributed antenna apparatus, comprising:
   at least one downlink radio frequency (RF) interface configured to receive downlink RF signals and distribute the downlink RF signals over at least one downlink communications medium to one or more remote antenna units (RAUs);
   at least one protection circuit communicatively coupled to the at least one downlink RF interface, the at least one protection circuit being configured for
   detecting electrical power of at least a portion of the downlink RF signals, and
   diverting a remainder portion of the downlink RF signals away from the at least one downlink RF interface in response to the detected electrical power being equal to or greater than a predetermined electrical power, wherein the remainder portion is a portion of the downlink RF signals that does not include the at least a portion of the downlink RF signals;
   wherein the at least one protection circuit comprises:
   at least one power detector for detecting the detected electrical power of the at least a portion of the downlink RF signals;
   at least one comparator operatively associated with the at least one power detector for determining whether the detected electrical power is equal to or greater than the predetermined electrical power;
   at least one RF switch operatively associated with the at least one comparator for diverting at least the remainder portion of the downlink RF signals away from the at least one downlink RF interface in response to the at least one comparator determining that the detected electrical power being equal to or greater than the predetermined electrical power; and at least one coupler operatively associated with both the at least one power detector and the at least one RF switch, wherein:

the at least one coupler is configured for splitting the at least a portion of the downlink RF signals and the remainder portion of the downlink electrical RF signals from one another, the at least one coupler being operatively associated with the at least one power detector comprises the at least one power detector receiving the at least a portion of the downlink electrical RF signals, and the at least one coupler being operatively associated with the at least one RF switch comprises the at least one RF switch receiving the remainder portion of the downlink electrical RF signals.

2. The distributed antenna system apparatus of claim 1, wherein:

the at least a portion of the downlink RF signals is a sample portion of the downlink RF signals, and the predetermined electrical power is indicative of electrical power of the downlink RF signals being in a range from 0.1 watts to 100 watts.

3. The distributed antenna system apparatus of claim 1, wherein the at least one protection circuit is configured for diverting up to 100 watts away from the at least one downlink RF interface in response to the detected electrical power being equal to or greater than the predetermined electrical power.

4. The distributed antenna system apparatus of claim 1, wherein:

the predetermined electrical power is a first predetermined electrical power; and the at least one protection circuit comprises hysteresis so that the at least one protection circuit is configured for allowing the remainder portion of the downlink RF signals to pass through to the at least one downlink RF interface in response to the detected electrical power being equal to or less than a second predetermined electrical power that is less than the first predetermined electrical power.

5. The distributed antenna system apparatus of claim 1 in combination with a base transceiver station (BTS) for providing the downlink RF signals, wherein the at least one protection circuit is communicatively coupled to the BTS such that the at least one protection circuit is positioned between the BTS and the at least one downlink RF interface.

6. The distributed antenna system apparatus of claim 1 in combination with an electrical load, wherein the at least one protection circuit is communicatively coupled to the electrical load, and the at least one protection circuit is configured for diverting the remainder portion of the downlink RF signals to the electrical load in response to the detected electrical power being equal to or greater than the predetermined electrical power.

7. The distributed antenna system apparatus of claim 1, further comprising at least one uplink RF interface configured to receive uplink RF signals over at least one uplink communications medium from the one or more RAUs.

8. The distributed antenna system apparatus of claim 7, wherein the at least one downlink communications medium and the at least one uplink communications medium includes at least one optical fiber medium.

9. The distributed antenna system apparatus of claim 1, further comprising a digital to analog converter coupled to a first port of the comparator, and the power detector being coupled to a second port of the comparator.

10. The distributed antenna system apparatus of claim 1, wherein the at least one RF switch comprises a solid state relay.

* * * * *